United States Patent [19]

Denny

[11] Patent Number: 5,328,214

[45] Date of Patent: Jul. 12, 1994

[54] SPRING PIPE CONNECTOR

[76] Inventor: James K. Denny, 1034 Triangle Rd., Ashland City, Tenn. 37015

[21] Appl. No.: 72,062

[22] Filed: Jun. 7, 1993

[51] Int. Cl.⁵ ............................................ F16L 21/00
[52] U.S. Cl. .................... 285/235; 285/12; 285/55; 285/286; 285/236
[58] Field of Search ............... 285/114, 115, 116, 235, 285/236, 223, 286, 283, 12, 55; 403/224

[56] References Cited

U.S. PATENT DOCUMENTS

| | | | |
|---|---|---|---|
| 409,120 | 8/1889 | Soule | 285/236 X |
| 739,097 | 9/1903 | Marcy | 285/114 |
| 1,242,974 | 10/1917 | Sheafe et al. | 285/235 X |
| 3,254,907 | 6/1966 | Imus | 285/144 X |
| 3,272,535 | 9/1966 | Neely | 285/114 |
| 3,653,691 | 4/1972 | Bram | 285/236 |
| 3,881,754 | 5/1975 | Christie | 285/114 |
| 4,059,293 | 11/1977 | Sipler | 285/236 |
| 4,846,511 | 7/1989 | Krumscheid | 285/235 |
| 4,989,903 | 2/1991 | McAllister | 285/114 |
| 5,143,409 | 9/1992 | Lalikos | 285/235 X |

FOREIGN PATENT DOCUMENTS 1426 1/1979 Japan ...................... 285/236

Primary Examiner—Dave W. Arola

[57] ABSTRACT

A spring connecting or adapted to connect the cut-off ends of an exhaust pipe, particularly of a tractor or the like, after it has been cut in two. The spring is preferably welded at each end to a corresponding end of the exhaust pipe cut in two, or, when an adapter or flared connector pipe is used at each end, the adapter or flared connector pipe is so welded. A flexible liner hose may be used and may have each adapter embedded in it. Each adapter may have a notch or V-cut in it at each cut-off end of the exhaust pipe.

3 Claims, 1 Drawing Sheet

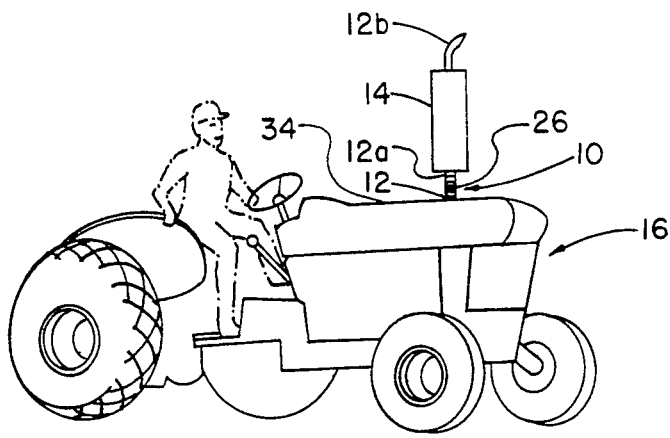
FIG 1
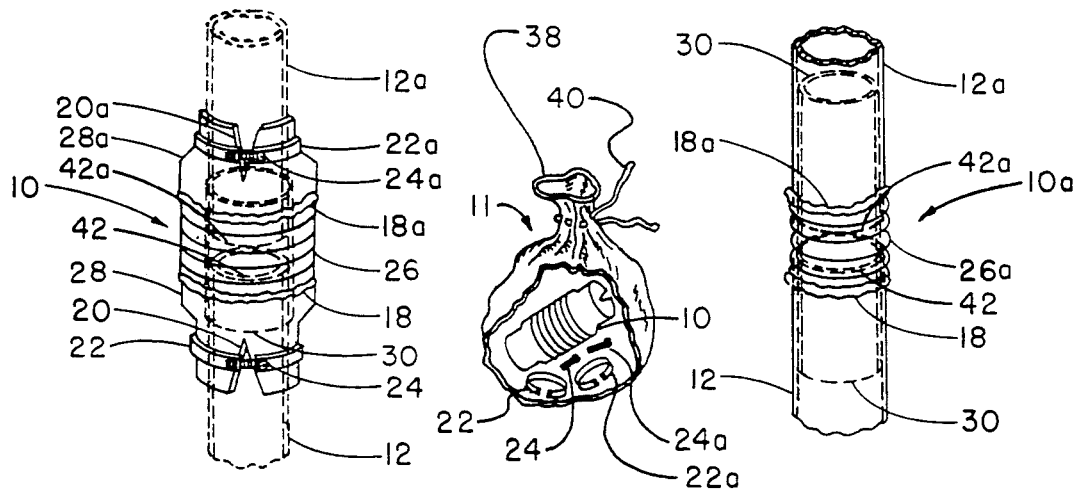
FIG 2  FIG 6  FIG 3
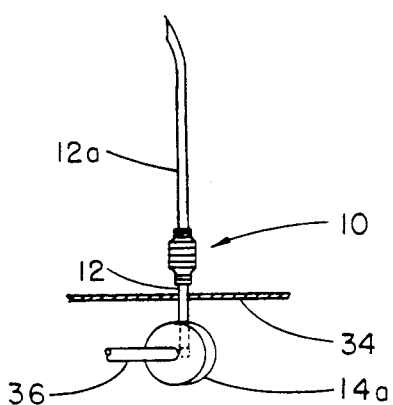
FIG 4
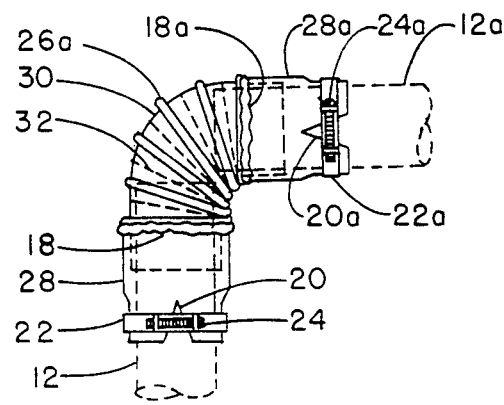
FIG 5

SPRING PIPE CONNECTOR

BACKGROUND OF THE INVENTION

1. Field of the Invention

This invention relates to exhaust systems. More particularly, it relates to damage protection apparatus for an exhaust pipe for tractors, trucks and the like.

2. Description of the Prior Art

For many years there has been a need for protection of an exhaust pipe which will not bend on a tractor, trailer truck or the like, whether below or above the hood when it touches or strikes a limb in a field or top frame of a garage, terminal or the like. U.S. Pat. No. 3,173,710 provides an interconnection between an engine exhaust manifold and a muffler which readily disconnects whenever the cab is tilted. There is a double-bell unit between the muffler and an expansible hose unit, the bell unit having a spring therein which tubes in the bell unit apart. U.S. Pat. No. 4,378,945 teaches a bellows-type spring seal with coil springs encircling the bellows. U.S. Pat. No. 4,339,919 discloses a relatively thin, flexible, generally vertical metal hanger made up of a plurality of thin, stainless steel, strips overlaid on one another to flexibly connect and support a muffler to an engine or frame. The muffler is connected to an internal combustion engine by a rigid exhaust pipe. In U.S. Pat. No. 4,567,817 the inventors present a vehicle exhaust pipe which extends vertically through the vehicle interior, up to a point above the roof, and is surrounded by a protective tube. A collective funnel on the vehicle rood overlaps the end of the exhaust pipe, has a transfer pipe, is pivotally mounted on suspension elements and is resiliently directed into an upward-pointed position. A muffler disclosed in U.S. Pat. No. 4,308,930 mounted on the hood of an engine compartment has an outer cylindrical member, with openings therein, an inner cylindrical member connected to an exhaust pipe and an exhaust pipe connected to the upper end of the outer cylindrical member, the outer cylindrical member being mounted on the hood so that its lower half is positioned below the hood. From the disclosure of U.S. Pat. No. 3,352,573 it is found that a pipe for diesel exhaust may be provided with a hinged connector so that a stack elevated high above the truck and cab body may be supported without whipping due to high wind, motor vibration and lowered for moving under low bridges and through doors of buildings. U.S. Pat. No. 2,489,481 teaches an exhaust pipe extension that is damage proof itself and protects the exhaust pipe from damage by striking obstructions. A compression spring surrounds a guide bar. A spring is provided to yieldingly resist forward movement of an outer tube 20. In U.S. Pat. No. 2,489,480 is described how backing into an obstruction will compress a close-coiled section of a spring of an exhaust pipe extension and slide it forward.

None of the foregoing patents teaches how to keep from breaking off an exhaust pipe when one drives a vehicle such as a tractor or a cab for a tractor-trailer or the like under one or more low branches when plowing a field or the like or driving such vehicle under a low garage door frame or the like.

SUMMARY OF THE INVENTION

After extended investigation I have found that by cutting a tractor, truck of the like vehicle exhaust pipe in two some distance from its exhaust discharge end I can insert a flat or circular coiled spring between the two ends thus formed so that the end part of the exhaust pipe which may be too tall or high to go under the limbs of a tree, top of a barn or garage door will bend up to 90° and not break off or be otherwise damaged. I prefer to employ a flared connector pipe at each cut-off end of the exhaust pipe. In addition the spring may have inside it a flexible, temperature-resistant liner hose in which the coiled spring may be embedded. Each flared connector pipe may have a notch in the end thereof to allow for contraction. The flared connector pipes may have clamps therearound which my be tightened by screws.

Instead of the spring being positioned between two cut-off ends of an exhaust pipe, it may have one of the ends attached to the end of a muffler through which exhaust gases are intended to go.

For convenience according to the invention I also provide a kit containing the spring exhaust pipe connector with two clamps and two screws for assembling it between the two exhaust pipe ends formed by cutting an exhaust pipe in two.

BRIEF DESCRIPTION OF THE DRAWING

For a better understanding of my invention reference will now be made to the drawing, in which:

FIG. 1 is a perspective view showing an alternate use of the spring of the invention in which it is mounted on the exhaust pipe of a tractor above a hood just before a muffler.

FIG. 2 is a perspective view showing the spring exhaust pipe connector of the invention as a separate item such as it could be sold in farm stores (except for here here having dotted lines to show how it could be mounted between two cut-off ends of an exhaust pipe.

FIG. 3 is a perspective view of the exhaust pipe spring installed in the exhaust line of a truck, tractor or the like FIG. 4 is an elevation view showing the exhaust pipe spring of the invention installed as a portion of the exhaust pipe which extends above the hood of a vehicle, a muffler being located in a part of the exhaust pipe beneath the hood.

FIG. 6 is a perspective view showing a kit according to the invention containing a spring exhaust pipe connector according to the invention and two clamps and two springs for fastening the connector to the aforementioned two ends of an exhaust pipe.

FIG. 5 is a perspective view showing how the exhaust pipe spring connector of the invention may be bent a full 90° without any harm when the exhaust pipe strikes a branch or the like.

DETAILED DESCRIPTION

In the drawing, spring exhaust pipe connector 10, the spring portion of which is also sometimes referred to herein as spring (10a in the embodiment of FIG. 3 where the spring is a built-in part of the exhaust pipe of the tractor as manufactured) is positioned connecting lower and upper parts 12, 12a of the exhaust pipe with muffler 14 being shown in FIG. 1 such as commonly employed for tractors, tractor trailers and the like and having another length of the exhaust pipe at the discharge end of the muffler 14 shown as 12b. The muffler is shown in an under-the-hood form as 14a. Respective lower and upper flared connector pipes 28, 28a may hold in place each end of spring exhaust pipe connector 10 (the spring being either flat 26 or round 26a) They may be tightened by screws 24, 24a used with the clamps 22, 22a around the connector pipes 28, 28a. Top and bottom notches 20, 20a may be employed on each flared connector pipe 28, 28a to permit their contraction. It is also possible to use coiled spring 32 embedded in liner hose 30 to prevent collapse.

Respective lower and upper connector pipes 28, 28a welded respectively at 18, 18a to spring 26, 26a connect it to respective ends 42, 42a of exhaust pipe sections 12, 12a. When a flexible, temperature-resistant liner hose 30 inside the exhaust pipe along the length of the spring connector is used to lessen loss of exhaust along the length of the exhaust pipe, spring 26 (flat) or 26a (round) is preferably embedded therein. Top and bottom V-cuts or notches 20, 20a in liner hose 30 allow for contraction of flared connector pipes 26, 26a which may result from pressure of clamps 22, 22a.

In another embodiment of the invention the parts for installing the exhaust pipe spring connector of the invention are contained in a container or kit (pouch) (this embodiment of the invention being indicated by 11), the container has therein an exhaust pipe spring connector according to the invention 10 plus two clamps 22, 22a and two screws 24, 24a for tightening the clamps 22, 22a. This is a convenience for a farmer who has means to cut apart an exhaust pipe and wants to install an exhaust pipe spring connector of the invention and can obtain a kit from a farm supply store. Also drawstring 40 makes it easy for him to open the pouch.

In the embodiment shown in FIG. 4 with the spring exhaust pipe connector of the invention shown above a hood 34 and connecting an upper part of the exhaust pipe 12a with a lower part 12, the part of the exhaust pipe under hood 34 goes through a muffler 14a and a manifold 36.

While the invention has been described in terms of preferred embodiments, the claims appended hereto are intended to encompass all embodiments which fall within the spirit of the invention.

Having thus described my invention and certain preferred embodiments thereof, I claim:

1. A pipe spring connector comprising two sections of axially aligned pipe, said pipes having outer surfaces and terminating in ends which face each other and are axially spaced from each other and having as the sole link between them a single coiled spring by itself touching nothing along its length except a weld at each end thereof joining said spring ends directly to said outer surface of said ends of said respective two sections of pipes.

2. The connector of claim 1 wherein said coiled spring is round.

3. The connector of claim 1 wherein said coiled spring is flat.

* * * * *